June 23, 1925.
F. T. WHEELER
INCLOSED SWITCH CONSTRUCTION
Filed July 3, 1922
1,543,352
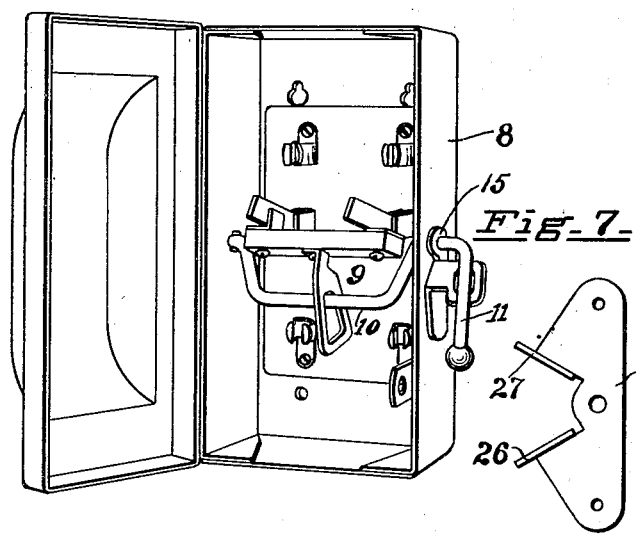
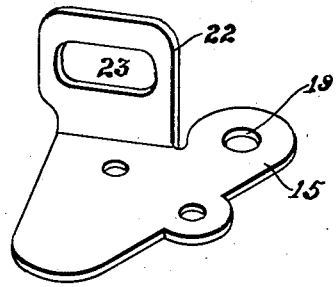
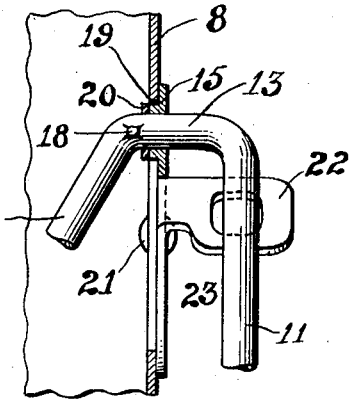
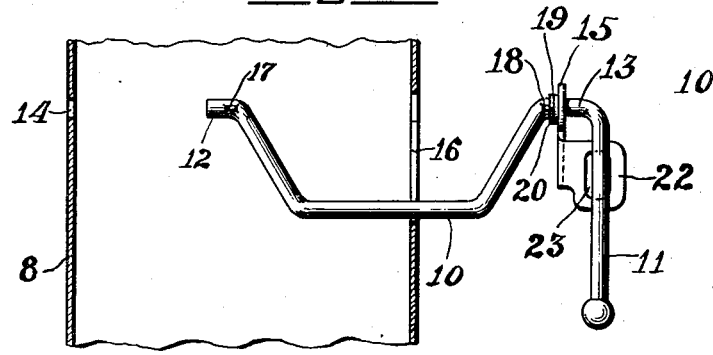
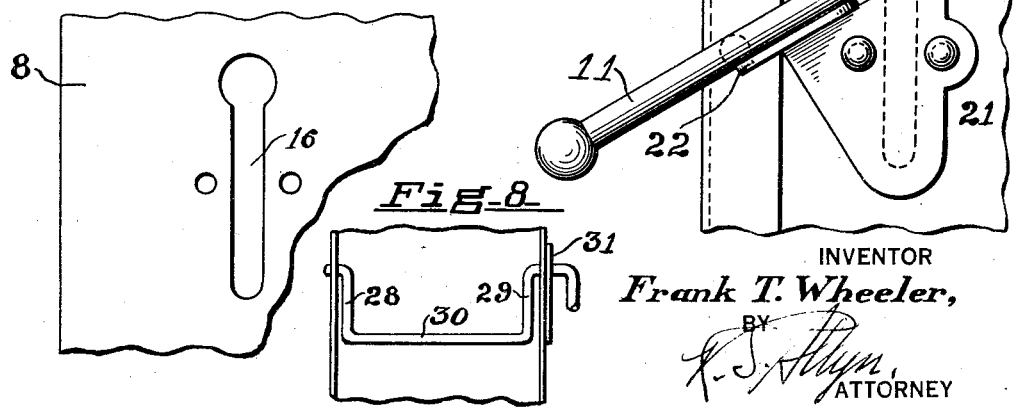
INVENTOR
*Frank T. Wheeler,*
BY
ATTORNEY Patented June 23, 1925.

1,543,352

UNITED STATES PATENT OFFICE.

FRANK T. WHEELER, OF PLAINVILLE, CONNECTICUT, ASSIGNOR TO THE TRUMBULL ELECTRIC MANUFACTURING COMPANY, OF PLAINVILLE, CONNECTICUT, A CORPORATION OF CONNECTICUT.

INCLOSED-SWITCH CONSTRUCTION.

Application filed July 3, 1922. Serial No. 572,432.

*To all whom it may concern:*

Be it known that I, FRANK T. WHEELER, a citizen of the United States of America, residing at Plainville, Conn., have invented a new and useful Inclosed-Switch Construction, of which the following is a specification.

My invention relates particularly to the construction for supporting the operating member and handle.

The main object is to provide a simple and economical construction which may be readily manufactured and the parts of which may be readily assembled. A specific object is to provide a construction in which the operating crank may be formed in the desired shape and then inserted in the box by a straight thrust.

Another object is to securely hold the crank in the box in a very simple manner.

Another object is to provide a combined bearing and stop member for the handle.

In the preferred construction, a switch box is provided with a seat or bearing at one side for one end of the crank shaft, and an elongated slot in the other side to permit insertion of the crank. The other end of the crank shaft adjacent the handle is provided with a bearing member formed in a plate adapted to be secured at the slotted side of the box. This plate also has a lug affording a stop for the handle.

Fig. 1 is a perspective view of one form of enclosed switch construction, the cover of the box being shown open.

Fig. 2 is a perspective view of the combined bearing plate and stop member.

Fig. 3 is a sectional view of the box showing the crank shaft in the act of assembly.

Fig. 4 is a fragmentary plan and sectional view showing the bearing and stop plate as applied to the box.

Fig. 5 is a side view showing a fragment of the box with the slot for receiving the crank.

Fig. 6 is a side view of a fragment of the box with the bearing and stop plate and handle in place.

Fig. 7 is a side view of a modified form of bearing and stop plate having stops for the handle in both On and Off positions.

Fig. 8 is a detail view showing another form of crank construction.

The box 8 may be of any suitable form and contain any suitable form of switch 9. The crank 10 is provided with a handle 11 and bearings 12 and 13.

The box is provided with a stationary seat 14 for the bearing 12 of the crank shaft. The other stationary bearing or seat 15 is in the form of a plate member adapted to be strung on to the crank after the crank is formed to the desired shape.

The box is provided with a slot 16 through which the crank and bearing member 12 may be inserted by a straight thrust as indicated in Fig. 3. The plate member 15 serves to cover this slot 16 when the parts are assembled.

The crank member may be provided with one or more lugs such as 17 and 18 to act as stops to prevent the crank from shifting laterally when the parts are once assembled.

The bearing plate 15 may be provided with an extension hub or flange 19 which furnishes an elongated bearing for the crank shaft. To prevent the lug 18 from cutting into or wearing the end of the bearing flange 19, I may provide a washer 20 which is smooth and interposes but little resistance to rotation.

The plate 15 may be secured to the box in any suitable manner as by spot welding or by rivets 21.

I may also combine the bearing plate 15 with a stop lug 22 to limit the throw of the handle 11. This lug 22 may be provided with an opening 23 for a sealing wire or padlock shackle.

The bearing plate 25 may be in the form shown in Fig. 7 where two stop lugs 26 and 27 are provided to limit the throw of the handle in opposite directions.

In constructions of a similar class it has been customary to punch holes in the sides of the box which holes serve as bearings for the crank member and then to wiggle the preformed crank through these holes and spring it into place; this method necessitated that the bends in the crank be considerably less than ninety degree angles and that the bending points be considerably rounded in order to wiggle the crank through holes of a diameter slightly larger than the crank. In my construction it is possible to pre-form the crank member with bends of any degree of angularity or width of the bail portion of the crank, for instance, it is possible to bend the arms of the crank so that the arms are parallel to the sides of the box and sufficiently close thereto to form an effective stop for preventing any longitudinal movement of the crank member as shown in Fig. 8, where the arms 28 and 29 serve as stops to prevent longitudinal movement of the crank 30 when the plate 31 is fastened to the box.

I claim:

1. In an enclosed switch a box having a bearing seat in one side and an elongated closed sided slot in the other side, a switch mounted in said box, an operating crank having an integral handle with bearing portions, one end of said crank being supported in said seat, an integral sheet metal plate having a flanged bearing formed from it and projecting into one end of said slot and forming a bearing for said crank and covering said elongated slot, said crank being insertible through said slot, and means for securing said plate to the side of said box to cover said slot.

2. In an enclosed switch, a box, a switch within the box, an operating crank having one end supported in one wall of said box, the opposite wall of said box having a slot to permit the entrance of said crank, a bearing plate for the other end of said crank secured to the box to cover said slot and being provided with integral means to stop and to lock the said crank when in the Off position.

3. In an enclosed switch construction, a box, a switch within the box, a pre-formed switch operating member having a crank portion and a handle portion, a bearing for one end of said crank in one side of the box, a slot in the opposite side of the box to receive the crank portion of the operating member and a plate member secured to the box to cover said slot, the said plate having a bearing for the other end of the crank, and an integral stop means to limit the movement of the operating handle.

4. In an enclosed switch, a box, a switch operating crank having one end supported in one wall of said box, the opposite wall of said box having a slot, a bearing plate for the other end of said crank covering said slot and a stop lug for said crank integral with said bearing plate to limit rotary movement of said crank.

5. In an enclosed switch, a box, a switch operating crank having one end supported in one wall of said box, the opposite wall of said box having a slot, a bearing plate for the other end of said crank covering said slot and stop lugs for said crank integral with said bearing plate to limit rotary movement of said crank in two directions.

6. In an enclosed switch construction the combination of a switch box having a bearing at one side and an elongated slot at the opposite side, a switch operating member having a handle and two bearing portions with an offset crank portion between said bearing portions one end of said member being adapted to rotate in said bearing, said end and said crank portion being adapted to be inserted by a straight longitudinal thrust through said slot and a plate mounted on said member between said handle and said crank and secured to said box over said slot forming a bearing for said member and a stop for said handle.

FRANK T. WHEELER.